US012783389B2

(12) United States Patent
Subramanian et al.

(10) Patent No.: US 12,783,389 B2
(45) Date of Patent: Nov. 3, 2026

(54) AUTOMATION TOOL FOR ENTITY MANIPULATION LANGUAGE (EML) SCENARIOS

(71) Applicant: SAP SE, Walldorf (DE)

(72) Inventors: Krishnan Harihara Subramanian, Bangalore (IN); Dinesh Bhandarkar, Bangalore (IN)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 18/436,221

(22) Filed: Feb. 8, 2024

(65) Prior Publication Data

US 2025/0258756 A1 Aug. 14, 2025

(51) Int. Cl.

*G06F 11/3668* (2025.01)
*G06F 8/35* (2018.01)
*G06F 11/3698* (2025.01)

(52) U.S. Cl.

CPC ............ *G06F 11/3684* (2013.01); *G06F 8/35* (2013.01); *G06F 11/3698* (2025.01)

(58) Field of Classification Search

CPC .... G06F 11/3684; G06F 8/35; G06F 11/3698; G06F 11/3688

See application file for complete search history.

(56) References Cited

U.S. PATENT DOCUMENTS

| | | | | |
|---|---|---|---|---|
| 11,308,504 | B2 * | 4/2022 | Bs | G06F 11/36 |
| 2015/0007129 | A1 * | 1/2015 | William | G06F 8/30 717/106 |
| 2017/0109269 | A1 * | 4/2017 | Angermayer | G06F 16/22 |
| 2021/0382816 | A1 * | 12/2021 | Chapagain | G06F 11/3684 |
| 2022/0374341 | A1 * | 11/2022 | Brown | G06F 11/3684 |
| 2024/0143417 | A1 * | 5/2024 | Hrastnik | G06F 9/542 |
| 2025/0173133 | A1 * | 5/2025 | Jain | G06F 8/61 |
| 2025/0181485 | A1 * | 6/2025 | Kuboniwa | G06F 11/3688 |

* cited by examiner

*Primary Examiner* — Wei Y Mui
*Assistant Examiner* — Travis Viet Tran
(74) *Attorney, Agent, or Firm* — Buckley, Maschoff & Talwalkar LLC

(57) ABSTRACT

According to some embodiments, systems and methods are provided including one or more models, each model defining a respective data entity; a memory storing processor-executable program code; and a processing unit to execute the processor-executable program code to cause the system to: receive a request to execute a test executable code for a first model of the one or more models; identify a model framework for the first model; generate the test executable code for the first model based on the identified model framework; generate an output via execution of the test executable code; and report an analysis of the generated output.

20 Claims, 20 Drawing Sheets

500

| BO NAME (504) | BO TECHNICAL NAME (506) | REFERENCE FIELD 1 (508) | REFERENCE FIELD 2 (510) |
|---|---|---|---|
| BUSINESS OBJECT NAME | BO ROOT VIEW (512) | REFERENCE FIELD 1 USED | REFERENCE FIELD 2 USED |

550

| BO NAME | BO TECHNICAL NAME | REFERENCE FIELD 1 | REFERENCE FIELD 2 |
|---|---|---|---|
| SERVICE CONTRACT | I_ServiceContractTP | ReferenceServiceContract | ReferenceServiceContractItem |
| SERVICE QUOTATION | I_ServiceQuotationTP | ReferenceServiceQtan | ReferenceServiceQtanItem |
| SERVICE ORDER | I_ServiceOrderTP | ReferenceServiceOrder | ReferenceServiceOrderItem |
| SERVICE CONFIRMATION | I_ServiceConfirmationTP | | |

FIG. 5

800

802

```
define root view entity I_ServiceOrderTP
  provider contract transactional_interface
  as projection on R_ServiceOrderTP as _ServiceOrderTP
{
      // Administrative Fields
  key ServiceOrder,
      @ObjectModel.foreignKey.association: '_ServiceObjType'
      ServiceObjectType,
      @ObjectModel.foreignKey.association: '_ServiceDocumentType'
      ServiceOrderType,
      ServiceOrderUUID,
      ServiceOrderDescription,
      Language,
      PostingDate,
      ServiceDocCreationDateTime,
      ServiceDocChangedDateTime,
      ServiceDocumentCreatedByUser,
      ServiceDocumentChangedByUser,
```

B

FIG. 8A

800

A

```
define behavior for I_ServiceOrderTP alias ServiceOrder
use etag
{
  use create;
  use update;
    use association _ServiceOrderItemTP I create; }
    //   use association _SrvcOrdPartnerTP { create; }
    use association _SrvcOrdReferenceObjectTP { create; }
    use association _SrvcOrdUserStatusTP { create; }
    use association _SrvcOrdPriceElementTP { create; }
    use association _SrvcOrdFUPSrvcConfTP;
    use association _SrvcOrdFUPBillgDocTP;
    use association _SrvcOrdFUPPurchaseOrderTP;
    use association _SrvcOrdFUPPurReqnTP;
    use association _SrvcOrdFUPSrvcEntrSheetTP;
    use association _SrvcOrdFUPSuplrInvcTP;
    use association _SrvcOrdDurationTP { create; }
    use association _SrvcOrdAppointmentTP { create; }
    use association _SrvcOrdrFUPMaintOrdTP;
    use association _SrvcOrdLongTextTP { create; }
    use association _SrvcOrdPartnerTP { create; }
}
define behavior for I_ServiceOrderItemTP alias ServiceOrderItem
use etag
{
  use update;
  use delete;

  use association _ServiceOrderTP;
  use association _SrvcOrdItemReferenceObjectTP { create; }
  use associstion _SrvcOrdItmPartnerTP { create; }
  use association _SrvcOrditemPriceElementTP { create; }
  use association _SrvcOrditmFUPSrvcConfTP;
  use association _SrvcOrdItmFUPBillgDocTP;
  use association _SrvcOrdItmFUPPurchaseOrderTP;
  use association _SrvcOrdItmFUPPurReqnTP;
  use association _SevcOrdItmFUPEntrySheetTP;
  use association _SevcOrdItmFUPSuplrInvcTP;
  use association _SrvcOrdItmUserStatusTP { create; }
  use association _SrvcOrdItemAppointmentTP { create; }
```

808 (use create; / use update;), 804, 806, 808

C

FIG. 8B

B

800

```
define behavior for R_ServiceOrderTP alias ServiceOrder
late numbering
lock master
authorization master ( global )
etag master ServiceDocChangedDateTime
{
  create ( precheck ); // precheck is implemented for fields validation before
  update ( precheck ); // precheck is implemented for fields validation before

  event Created parameter D_ServiceOrderCreated:
  event Changed parameter D_ServiceOrderChanged:
  event Deleted parameter D_ServiceOrderDeleted;
  event Completed parameter D_ServiceOrderCompleted:
  event Released parameter D_ServiceOrderReleased;
  event ReleaseRevoked parameter D_ServiceOrderReleaseRevoked;
  event ChgdWhenReleased parameter D_ServiceOrderChgdWhenReleased;

  /* Static field control definition */
  // Administrative fields
  field ( readonly ) ServiceOrder;
  field ( readonly ) ServiceObjectType;
  field ( mandatory : create, readonly : update ) ServiceOrderType;
  field ( readonly ) ServiceOrderUUID;
  field ( readonly ) ServiceDocCreationDateTime;
  field ( readonly ) ServiceDocumentCreatedByUser;
  field ( readonly ) ServiceDocChangedDateTime;
  field ( readonly ) ServiceDocumentChangedByUser;

  // Partners
  field ( mandatory ) SoldToParty;
```

809, 810

*FIG. 8C*

1300

```
1302 READ ENTITIES
Read entities of I_ServiceOrderTP
        Entity ServiceOrder
                All Fields with Value # ((ServiceOrderUUID = '<your UUID>'))
        Result Data (traversal4)
        Failed Data (failed)
        Reported Data (reported).
1304 MODIFY ENTITIES -CREATE
 MODIFY ENTITIES OF i_serviceordertp
     ENTITY serviceorder
       CREATE FROM lt_header_to_create
       CREATE BY \_serviceorderitemtp FROM lt_item_to_create_cba
1306 COMMIT ENTITIES
    RESPONSE OF i_serviceordertp
      FAILED      DATA(failed_commit)
      REPORTED    DATA(reported_commit).
-------------------
 MODIFY ENTITIES OF i_serviceordertp
     ENTITY serviceorder
       CREATE FROM lt_header_to_create
       CREATE BY \_serviceorderitemtp FROM lt_item_to_create_cba
       CREATE BY \_srvcordreferenceobjecttp FROM lt_refobj_to_create_cba
       CREATE BY \_srvcordpriceelementtp FROM lt_prcele_to_create_cba
       CREATE BY \_srvcorddurationtp FROM lt_duration_to_create_cba
       CREATE BY \_SrvcOrdAppointmentTP FROM lt_appt_to_create_cba
       CREATE BY \_SrvcOrdUserStatusTP FROM lt_ustat_to_create_cba
     ENTITY serviceorderitem
 CREATE BY \_srvcorditemreferenceobjecttp FROM lt_item_refobj_to_create_cba
 CREATE BY \_srvcorditempriceelementtp FROM lt_item_prcele_to_create_cba
       CREATE BY \_SrvcOrdItemAppointmentTP FROM lt_item_appt_to_create_cba
       CREATE BY \_SrvcOrdItemDurationTP FROM lt_item_dura_to_create_cba
       CREATE BY \_SrvcOrdItmUserStatusTP FROM lt_item_ustat_to_create_cba
         FAILED DATA(failed)
         REPORTED DATA(reported).
    COMMIT ENTITIES
    RESPONSE OF i_serviceordertp
      FAILED      DATA(failed_commit)
      REPORTED    DATA(reported_commit).
```

*FIG. 13*

1400

```
MODIFY ENTITIES OF i_serviceordertp
    ENTITY serviceorder
      CREATE FROM lt_header_to_create
      CREATE BY \_serviceorderitemtp FROM lt_item_to_create_cba
      CREATE BY \_srvcordreferenceobjecttp FROM lt_refobj_to_create_cba
      CREATE BY \_srvcordpriceelementtp FROM lt_prcele_to_create_cba
      CREATE BY \_srvcorddurationtp FROM lt_duration_to_create_cba
      CREATE BY \_SrvcOrdAppointmentTP FROM lt_appt_to_create_cba
      CREATE BY \_SrvcOrdUserStatusTP FROM lt_ustat_to_create_cba
    ENTITY serviceorderitem
CREATE BY \_srvcorditemreferenceobjecttp FROM lt_item_refobj_to_create_cba
CREATE BY \_srvcorditempriceelementtp FROM lt_item_prcele_to_create_cba
      CREATE BY \_SrvcOrdItemAppointmentTP FROM lt_item_appt_to_create_cba
      CREATE BY \_SrvcOrdItemDurationTP FROM lt_item_dura_to_create_cba
      CREATE BY \_SrvcOrdItmUserStatusTP FROM lt_item_ustat_to_create_cba
        FAILED DATA(failed)
        REPORTED DATA(reported).

   COMMIT ENTITIES
   RESPONSE OF i_serviceordertp
     FAILED      DATA(failed_commit)
     REPORTED    DATA(reported_commit).
```

FIG. 14A

1450

MODIFY ENTITIES OPERATIONS op_tab FAILED DATA(lt_failed) REPORTED DATA(lt_reported).

op_tab: Internal table which holds the entity and subentity information.

The "op" field of op_tab points to
if_abap_behv=>op-m-read operation or
if_abap_behv=>op-m-read_ba by read by association or
if_abap_behv=>op-m-create – create operation or
if_abap_behv=>op-m-create_ba – create by association or
if_abap_behv=>op-m-delete – delete operation or
if_abap_behv=>op-m-update – update operation or
if_abap_behv=>op-m-action – action operation or
if_abap_behv=>typekind-request – authorization operation or
if_abap_behv=>op-r-evaluate – function execution operation
lt_failed: EML statement failed reason is stored
lt_reported: EML statement reported will contain the error message for the failure

*FIG. 14B*

```
define behavior for R SrvcOrdItmPartnerTP alias SrvcOrdItemPartner
late numbering
authorization dependent by _ServiceOrderTP
lock dependent by _ServiceOrderTP
{
  update;
  delete ( features : instance );
  association SrvcOrdItemPartnerAddressTP Abbreviation ItemPrtnAddress
  (create;)
  association _ServiceOrderItemTP Abbreviation Item;
  association _ServiceOrderTP abbreviation ServiceOrder;
  field ( readonly ) ServiceOrder;
  field ( readonly ) ServiceOrderItem;
  field ( mandatory : create, readonly : update ) CustMgmtPartnerFunction;
  field ( mandatory : create, readonly : update ) CustMgmtBusinessPartner;
}
```

*FIG. 15*

AUTOMATION TOOL FOR ENTITY MANIPULATION LANGUAGE (EML) SCENARIOS

BACKGROUND

Test automation tools may test applications to verify functional and/or non-functional requirements via automated test scripts that test an end-to-end (E2E) scenario. An E2E scenario may include a sequence of process steps/tasks that may be supported by tools that execute program code to perform each of the steps automatically with minimal input from a user. Very often, users may encounter issues during execution of the E2E scenario, which may not be identified until completion of the E2E scenario. As a non-exhaustive example, for a Service Execution E2E scenario, there may be an error in an invoice creation task due to an issue with a pricing task, such that the service is completed but the work cannot be billed. Conventionally, the error is unknown until the invoice is not created, even though the error occurred in the pricing task.

The task steps may be performed via an OData protocol that provides for two computer systems to exchange data with each other via Representational State Transfer (RESTful) Application Programming Interfaces (API). A test automation tool (e.g., Postman®) may be used to test the exchange of data between the two computer systems. However, OData protocol may require a particular user interface or web API to access the appropriate data. Instead of an OData protocol, the process steps may be performed via queries written in an Entity Manipulation Language (EML). EML consists of statements that may be used to access and manipulate the data (e.g., perform the process steps) without using a particular user interface or web API. Presently there is no tool available to test the EML scenarios.

Systems and methods are desired to create and test E2E scenarios using EML.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 5 is a CDS view table according to some embodiments.

FIG. 8A is a diagram illustrating a RAP business object definition according to some embodiments.

FIG. 8B is a continuation of FIG. 8A according to some embodiments.

FIG. 8C is a continuation of FIG. 8B according to some embodiments.

FIG. 13 is a diagram illustrating a test script query according to some embodiments.

FIG. 14A is a diagram illustrating another test script query according to some embodiments.

FIG. 14B is a diagram illustrating another way of representing the test script query in FIG. 14A according to some embodiments.

FIG. 15 is a diagram illustrating a definition according to some embodiments.

Figure 1:
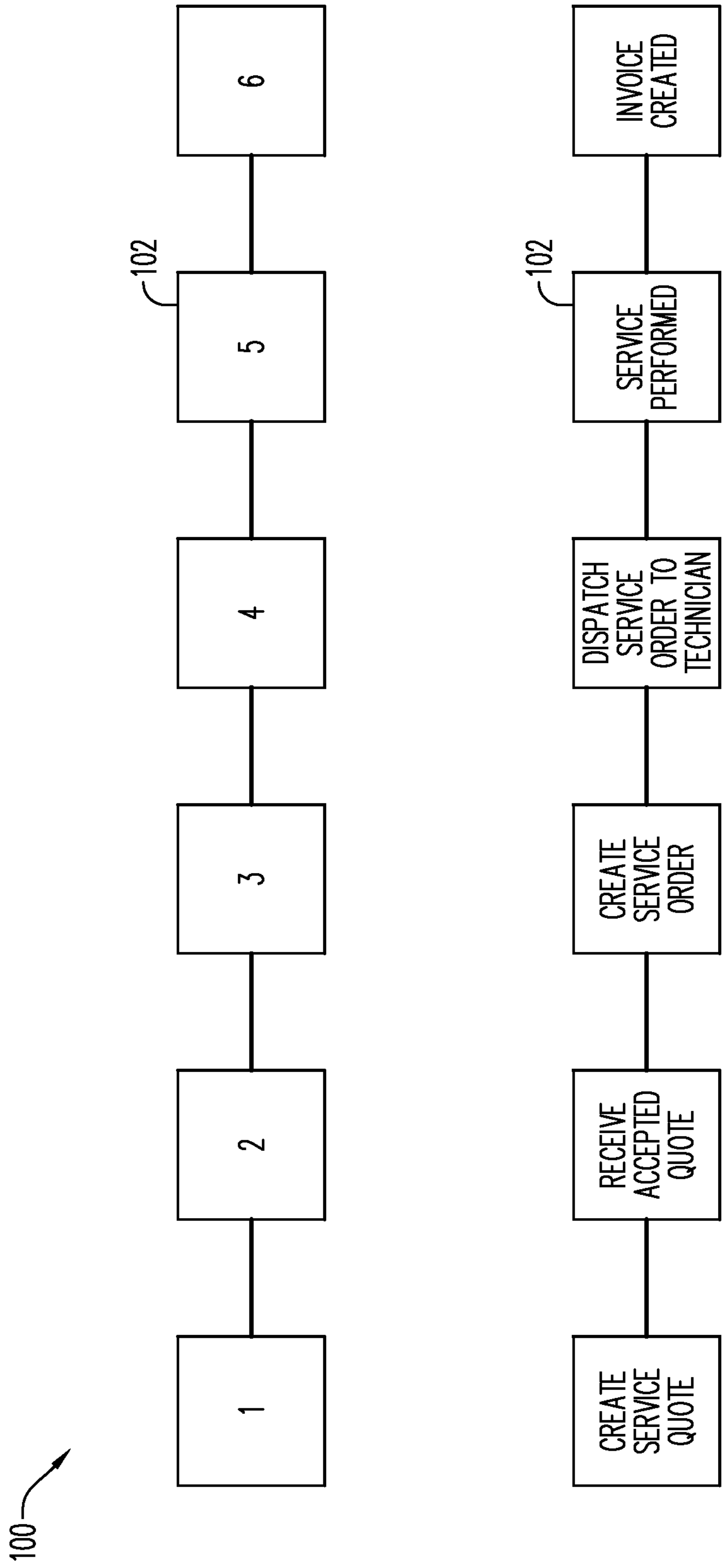
FIG. 1 is a block diagram of an E2E scenario according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, test automation tools may test applications to verify functional and/or non-functional requirements via automated test scripts (executable code) that test an end-to-end (E2E) scenario. An E2E scenario may include a sequence of process steps/tasks that may be supported by tools that execute program code to perform each of the steps automatically with minimal input from a user. Very often, users may encounter issues during execution of the E2E scenario, which may not be identified until completion of the E2E scenario. Each process step may be associated with a business object. Real objects, such as a service order, or a sales order, may be represented as business objects. A business object is a semantic entity that represents the smallest data unit in a business scenario. The business object is a container for the data and processes specified in its fields while hiding the structure and implementation details of the underlying data. As used herein, the terms "business object" and "data entity" may be used interchangeably. Conventionally, a business object may be implemented via an Advanced Business Application Programming (ABAP) Representational State Transfer (RESTful) (provided by SAP®) Application Programming Interface (API) architecture RESTful ABAP Programming Model (RAP). These business objects may be referred to as RAP business objects. A RESTful API is a way of accessing web services via an OData protocol without having any processing. The RESTful API may use HTTP requests to access and use data of the RAP business object, for example. The use of OData protocol, however, may require a particular application user interface (UI) or web API to access the appropriate data. The conventional automation tools may use an OData protocol to execute the automated test scripts.

Another method for accessing RAP business objects (individually and included in an E2E scenario) may be via Entity Manipulation Language (EML). EML is a form of ABAP language and may provide particular syntaxes to control business object behavior. EML may provide a means to type-save read and to modify access to data in transactional development scenarios. EML provides for direct access to business objects without the need for a particular application UI or web API. The EML may interact with business objects by triggering their supported operations for specified entities. The triggered operation may be used to check the transactional behavior of the business object. An operation may be triggered by EML if the operation is specified for the particular entity in a behavior definition for that entity. While EML may be used to check the transactional behavior of the business object, it is used manually, whereby each query and entity of an E2E scenario is manually tested individually. The manual testing is time consuming and may be an error-prone process.

Pursuant to some embodiments, an EML automation tool is provided to automatically test EML E2E scenarios. Unlike conventional API methodology that uses a signature of a business object entity to execute an operation, the EML automation tool statically specifies a target business object as the entity for use in the operation. Embodiments provide READ and MODIFY statements to access transactional scenarios of objects and may use a COMMIT statement for triggering a save sequence. These syntaxes (READ, MODIFY, COMMIT) may be used to perform the transactional behavior (Create, Update, Delete, Read, etc.) of business objects as defined in a behavior definition, according to one or more embodiments. The EML automation tool may provide for the creation of E2E automation scenarios, the editing of existing scenarios, and the execution of the scenarios (as defined by the user or predefined scenarios) through EML. Each business object may be connected to an appropriate RAP model. During execution of the E2E scenario, data is retrieved as per the appropriate RAP model, and the sequence of objects is executed as defined in the scenario workflow to retrieve the results. In one or more embodiments, the results may be assigned to a particular category based on a machine learning algorithm. Per the assignment, potential issues in the E2E scenario may be identified such that they may be addressed.

FIG. 1 shows an end-to-end (E2E) scenario 100 according to some embodiments. In particular, an organization may have one or more particular tasks 102 (e.g., 1-6) ("process steps") that may be executed to complete a process. Together the sequence of tasks 102 may be part of the E2E scenario 100, such that the E2E scenario comprises and is defined by a series of steps/tasks 102 that are completed to obtain/complete an objective. As a non-exhaustive example, consider the process of servicing an equipment malfunction as an E2E scenario 100. The tasks may include creating a service quote (Task 1), receiving acceptance of the quote from the customer (Task 2), creating a service order for an onsite repair (Task 3), dispatching the service order to a technician (Task 4), the technician performing the service (Task 5), and then creating an invoice for the completed service (Task 6). For each of these tasks, transactional data may be created.

Figure 2:
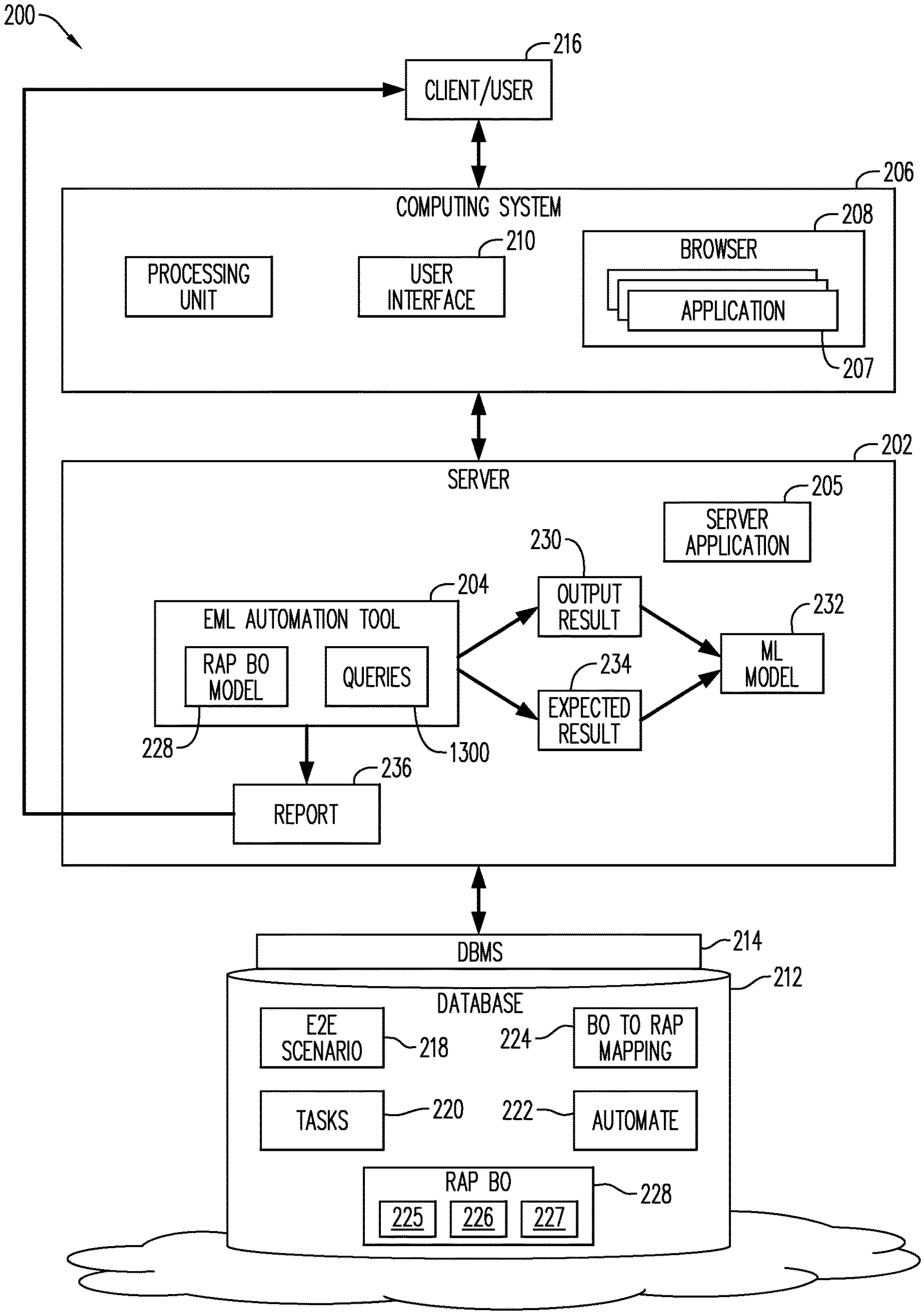
FIG. 2 is a block diagram of an architecture according to some embodiments.

FIG. 2 is a block diagram of an architecture 200 according to some embodiments. The illustrated elements of system architecture 200 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 200 are implemented by a single computing device, and/or two or more elements of system architecture 200 are co-located. One or more elements of system architecture 200 may be implemented using cloud-based resources, and/or other systems which apportion computing resources elastically according to demand, need, price, and/or any other metric.

System architecture 200 includes a backend server 202 including a EML automation tool 204, a local computing system 206 including a browser 208 running a client application 207, and user interface 210. System architecture 200 also includes a database 212, a database management system (DBMS) 214, and a client/user 216. As used herein, the terms "client", "user" and "end-user" may be used interchangeably.

The backend server 202 may include server applications 205. Server applications 205 may comprise server-side executable program code (e.g., compiled code, scripts, etc.) executing within the backend server 202 to receive queries/requests from clients/users 216, via the local computing system 206, and provide results to clients/users 216 based on the data of database 212, and the output of the EML automation tool 204. Server applications 205 may provide functionality (e.g., receiving a request via a drag-and-drop operation, data entry, and then retrieving data from the database 212 based on the request, processing the retrieved data and providing the data via the user interface 210 to clients/users 216).

The backend server 202 may provide any suitable interfaces through which clients/users 216 may communicate with the EML automation tool 204, or applications 205/207 executing thereon. The backend server 202 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface. Backend server 202 may be separated from or closely integrated with DBMS 214. A closely-integrated backend server 202 may enable execution of applications 205 completely on the database platform, without the need for an additional server. For example, backend server 202 may provide a comprehensive set of embedded services which provide end-to-end support for Web-based applications. Backend server 202 may provide application services (e.g., via functional libraries) which applications 205 may use to manage and query the database files stored in the database 212. The application services can be used to expose the database data model, with its tables, hierarchies, views and database procedures, to clients/users 216. In addition to exposing the data model, backend server 202 may host system services such as a search service, and the like.

Local computing system 206 may comprise a computing system operated by local user 216. Local computing system 206 may comprise a laptop computer, a desktop computer, or a tablet computer, but embodiments are not limited thereto. Local computing system 206 may consist of any combination of computing hardware and software suitable to allow local computing system 206 to execute program code to cause the local computing system 206 to perform the functions described herein and to store such program code and associated data.

Generally, local computing system 206 executes one or more of applications 207 to provide functionality to client/user 216. Applications 207 may comprise any software applications that are or become known, including but not limited to automation applications. As will be described below, applications 207 may comprise web applications which execute within a browser 208 of local computing system 206 and interact with corresponding server applications 205 to provide desired functionality. The client application 207 may send a user interface request (or other suitable request) to a server-side or back-end application ("server application") 205 for execution thereof. For example, when a user clicks on a button or enters information via a UI of the client application 207, a request is sent to the backend server 202. The backend server then responds with what needs to be rendered/content that is then provided to the client application. The user 216 may interact with the resulting displayed user interface 210 output from the execution of applications, to configure an RAP business object projection view, execute an automation test, and analyze an output of the executed automation test.

The client/user 216 may access the EML automation tool 204 executing within the backend server 202 to configure the E2E scenarios 218 for testing. The EML automation tool 204 may identify a hierarchical structure for each business object in the scenario and then generate test queries to test the operations associated with those business objects, as described further below.

The EML automation tool 204 may access data in the database 212 and retrieve the data so that it is provided at runtime. While discussed further below, the database 212 may store data representing scenarios 218 and tasks 220 and other suitable data. Selection of a given scenario 218 and execution of an automate 222 for that scenario may result in the retrieval of information based on a mapping per a BO to RAP mapping table 224. The mapping is of the business objects in the scenario to RAP BO 228. The mapping is based on a behavior definition ("definition") 226 of the RAP business object 228 stored on the database 212. Database 212 represents any suitable combination of volatile (e.g., Random Access Memory) and non-volatile (e.g., fixed disk) memory used by the system to store the data.

One or more applications 205/207 executing on backend server 202 or local computing system 206 may communicate with DBMS 214 using database management interfaces such as, but not limited to, Open Database Connectivity (ODBC) and Java Database Connectivity (JDBC) interfaces. These types of applications 205/207 may use Structured Query Language (SQL) to manage and query data stored in database 212.

DBMS 214 serves requests to store, retrieve and/or modify data of database 212, and also performs administrative and management functions. Such functions may include snapshot and backup management, indexing, optimization, garbage collection, and/or any other database functions that are or become known. DBMS 214 may also provide application logic, such as database procedures and/or calculations, according to some embodiments. This application logic may comprise scripts, functional libraries and/or compiled program code. DBMS 214 may comprise any query-responsive database system that is or becomes known, including but not limited to a structured-query language (i.e., SQL) relational database management system.

Database 212 may store data used by at least one of: applications 205/207 and the EML automation tool 204. For example, database 212 may store the business object data mapped to a particular task, which may be accessed by the EML automation tool 204 during execution thereof.

Database 212 may comprise any query-responsive data source or sources that are or become known, including but not limited to a structured-query language (SQL) relational database management system. Database 212 may comprise a relational database, a multi-dimensional database, an eXtensible Markup Language (XML) document, or any other data storage system storing structured and/or unstructured data. The data of database 212 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 202/local computing system 206.

For example, the client/user 216 may execute the browser 208 to request and receive a Web page (e.g., in HTML format) from a server application 205 of backend server 202 to provide the user interface 210 via HTTP, HTTPS, and/or WebSocket, and may render and present the Web page according to known protocols.

Figure 3:
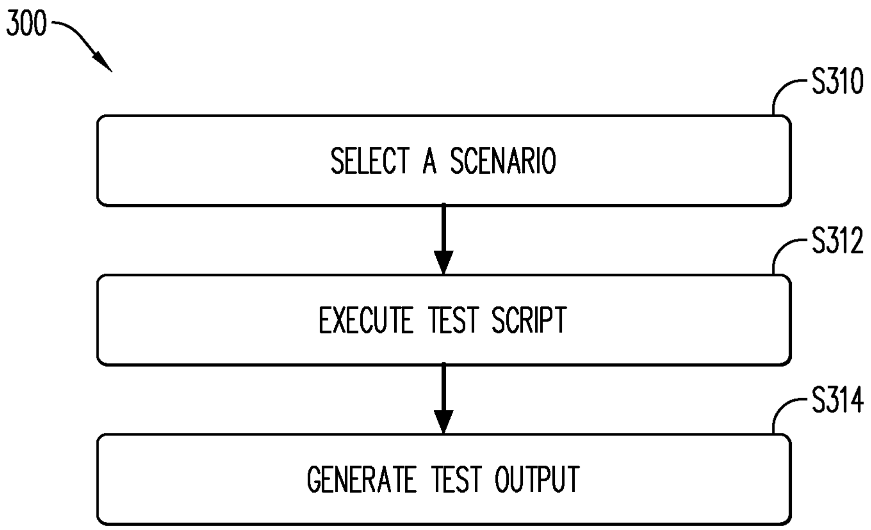
FIG. 3 is a flow diagram of a process according to some embodiments.

FIG. 3 illustrates a process 300 for testing a scenario in accordance with an example embodiment. The process 300, and other processes described herein, may be performed by a database node, a cloud platform, a server, a computing system (user device), a combination of devices/nodes, or the like, according to some embodiments. In one or more embodiments, the system architecture 200 may be conditioned to perform the process 300, and other processes described herein, such that a processing unit 1735 (FIG. 17) of the system architecture 200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 4:
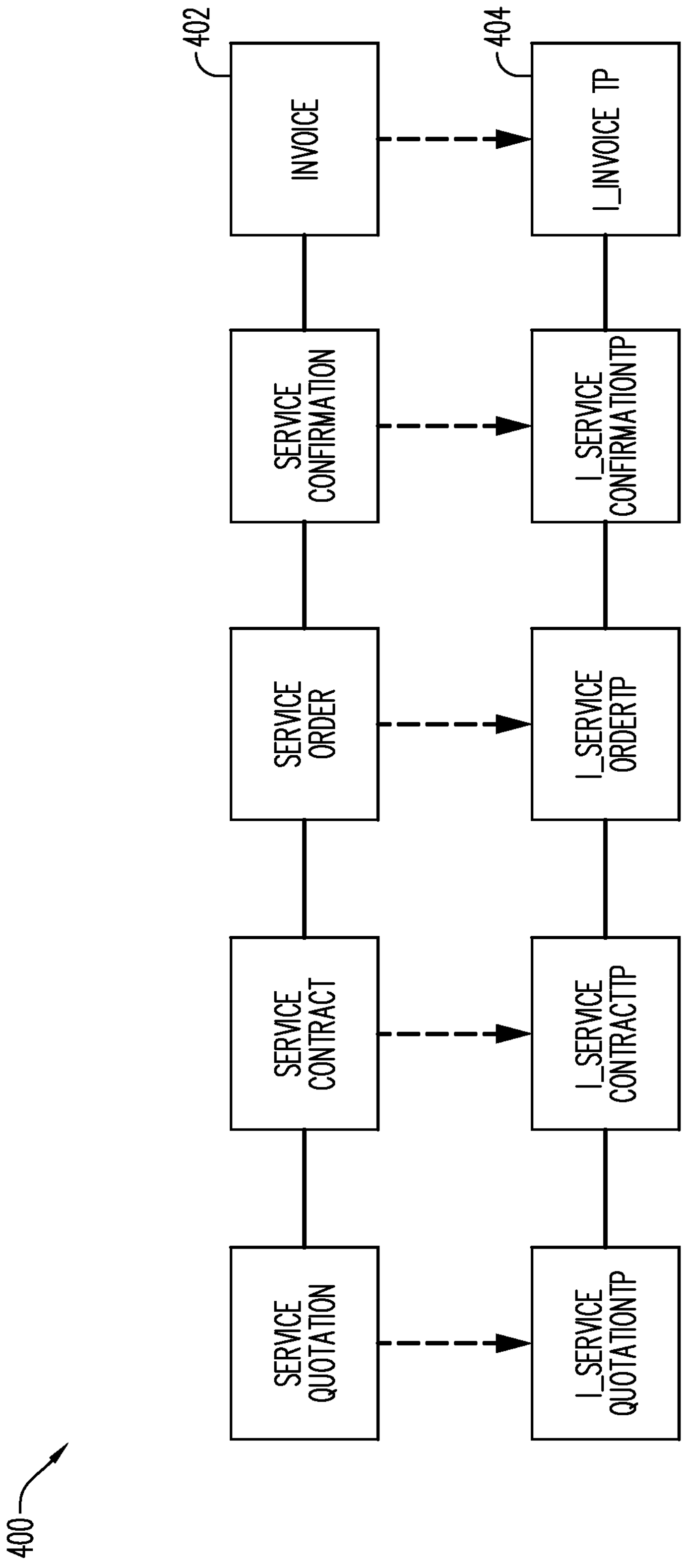
FIG. 4 is a block diagram of a business object and RAP business object according to some embodiments.

Prior to execution of the process, each business object 402 (FIG. 4) is configured as a RAP business object (BO) 404. A BO is a common term to represent real-world artifacts in application development, such as a product, or sales order. In FIG. 4, the Service Quotation BO 402 is represented as an I_ServiceQuotationTP RAP BO 404; the Service Contract BO 402 is represented as an I_ServiceContractTP RAP BO 404, the Service Order BO 402 is represented as the I_ServiceOrderTP RAP BO 404, etc. In general, a BO contains several nodes (e.g., Service Order Items, Service OrderItem Appointment, ServiceOrder Appointment) and common transactional operations for creating, updating and deleting data, etc. A RAP BO 228 has a model framework that is characterized by a structure 225, a behavior definition 226 and a corresponding runtime implementation ("BO runtime") 227.

The structure 225 of the RAP BO 228 may include a Code Data Service (CDS) view (a virtual data model allowing direct access to underlying tables of a database), which defines the structure (e.g., fields) of the RAP BO. As used herein, the terms "view" and "model" may be used interchangeably. A CDS view table 500 is provided in FIG. 5, including a plurality of parameters for each business object. The CDS view table 500 includes the following parameters: BO Name 504, BO Technical Name 506, Reference Field 1 508 and Reference Field 2 510. While Reference Field 1 and Reference Field 2 are shown herein, any suitable number of Reference Fields may be used. The CDS view table 500 includes a description of a value 512 for each parameter. For example, a Business Object (BO) Name value is provided for the BO Name parameter 504; a BO root view value is provided for the BO Technical Name parameter 506; a Reference field used value is provided for the Reference Field 1 parameter 508; and a Reference field used value is provided for the Reference Field 2 parameter 510. FIG. 5 also includes a non-exhaustive example of a CDS view table 550. Here, the Service Contract BO Name has a BO Technical Name of "I_ServiceContractTP," a Reference Field 1 of "ReferenceServiceContract," and a Reference Field 2 of "ReferenceServiceContractItem." Additionally, the Service Quotation BO Name has a BO Technical Name of "I_ServiceQuotationTP," a Reference Field 1 of "ReferenceServiceQtan," and a Reference Field 2 of "ReferenceServiceQtanItem." It is noted that in some instances, the BO may not include any reference fields. Continuing with the example in table 550, the Service Confirmation BO Name has a BO Technical Name of "I_ServiceConfirmationTP" and no reference fields. With respect to mapping the BO to a CDS view, the mapping may help to fetch the value by executing a corresponding CDS view. In this case, the EML automation tool 204 may execute the I_ServiceContractTP as the BO root view and fetch the respective details when the ReferenceServiceContract field is received. In an I_ServiceOrderTP CREATE operation, the result may be the Service Contract fetched value.

Figure 6:
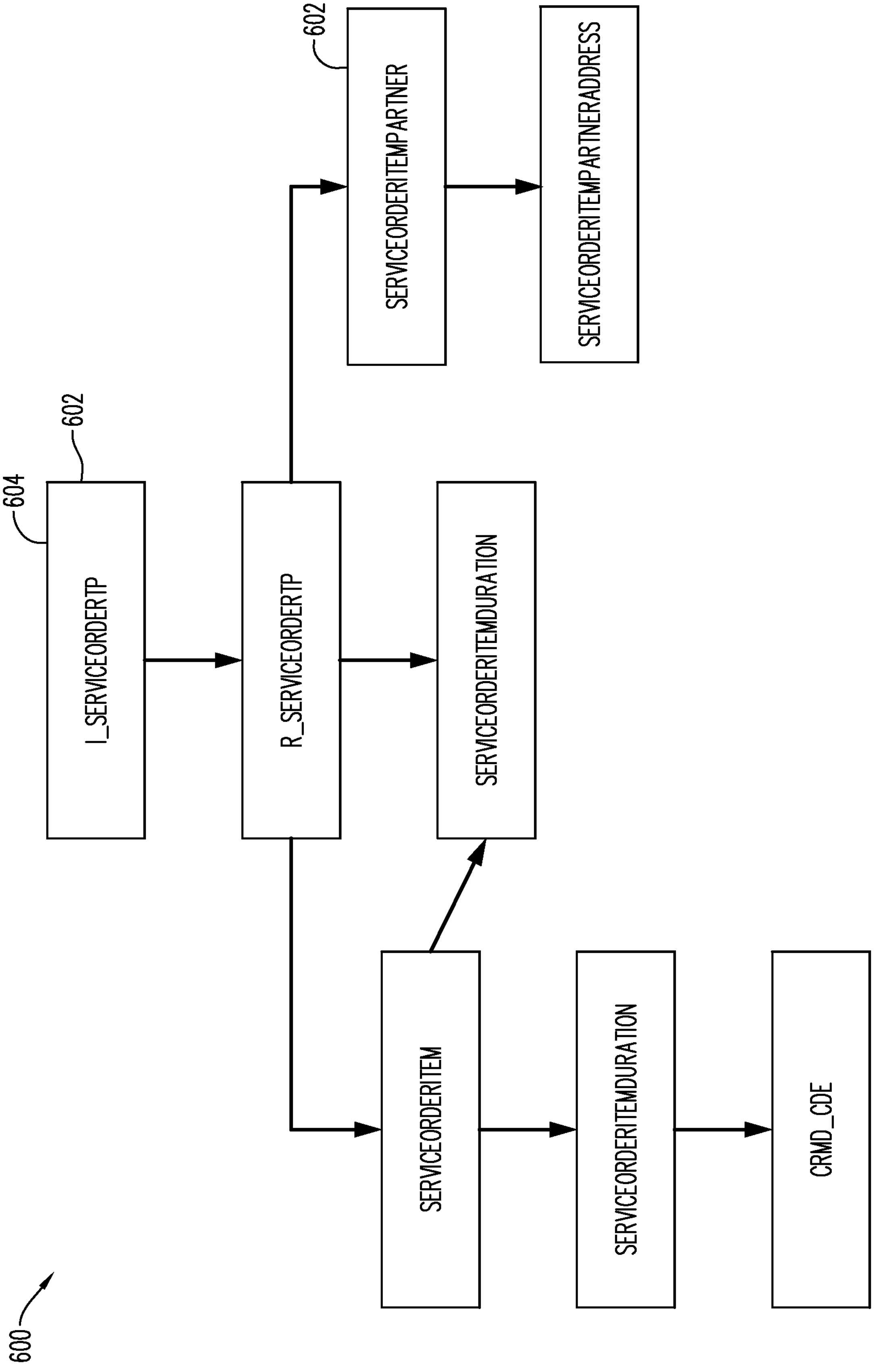
FIG. 6 is a hierarchy tree according to some embodiments.
Figure 7:
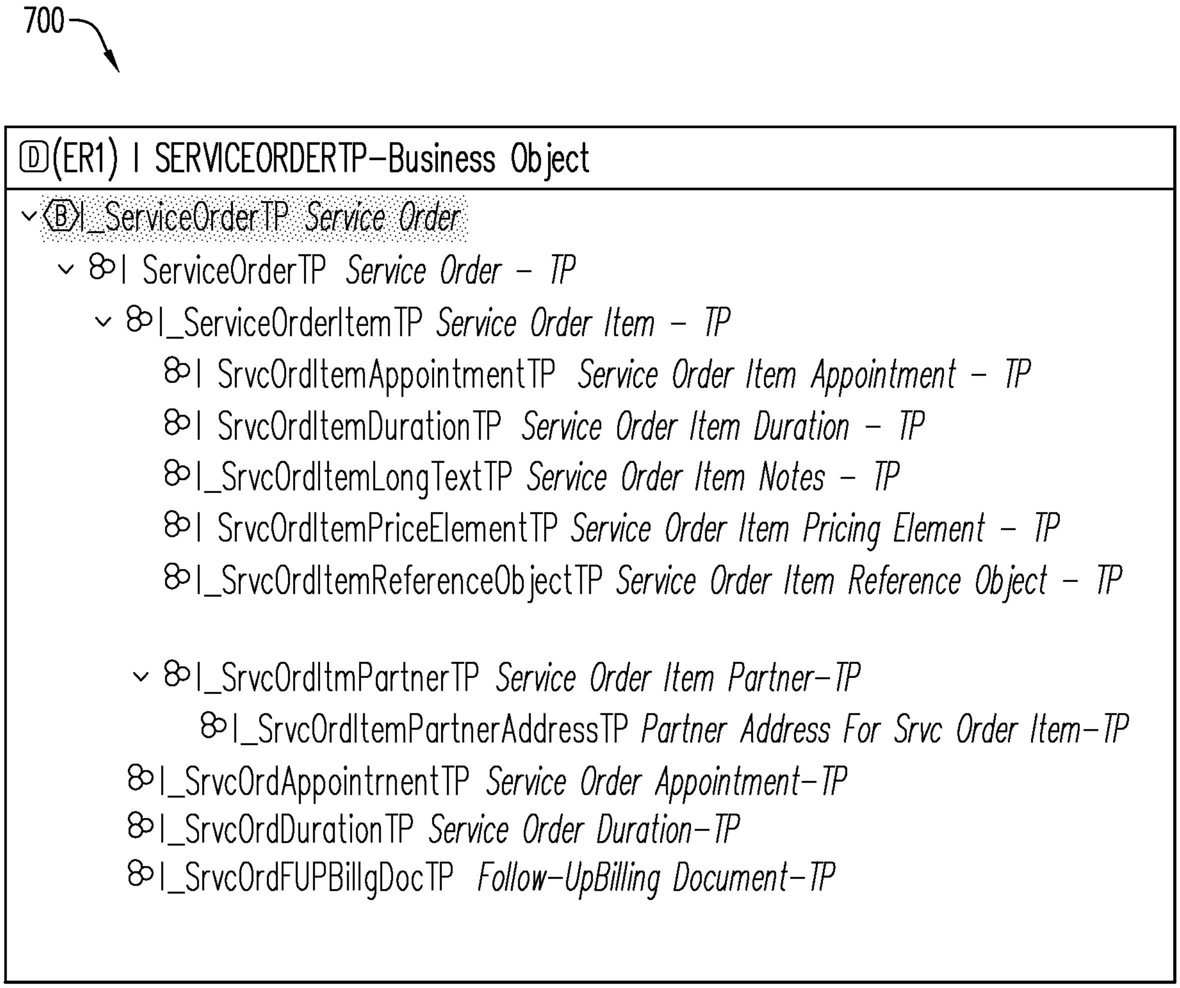
FIG. 7 is a list form of the hierarchy tree according to some embodiments.

The RAP BO structure may be organized as a hierarchical tree structure 600 of nodes 602 (FIG. 6), representing the fields, where the nodes are linked by associations (e.g., ServiceOrder, ServiceOrderItem, ServiceOrderItemDuration, etc.). The hierarchy may also be represented in list form (hierarchy list) 700 as shown in FIG. 7. A root entity 604 serves as a representation of the business object and defines the top node within the hierarchy on the RAP BO structure. This may be noted in the definition 800 with the keyword ROOT for the root entity 802, as described further below with respect to FIGS. 8A, 8B and 8C. Additionally, the relationship between the entities in the hierarchy may be expressed by the keyword ASSOCIATION 804 (FIG. 8B), as described further below with respect to FIGS. 8A, 8B and 8C.

The RAP BO behavior definition 226/800 describes operations performable by the BO. The behavior definition specifies which of the standard operations (e.g., create, update, delete, etc.) are allowed, as well as the field properties for the fields in the structure (CDS view). The behavior includes a behavior characteristic and a set of operations for each entity represented by a node of the business object's hierarchy tree. The operations may be performed through entities exposed by the RAP BO. The behavior definition may also contain the definition of validations (e.g., check that the data is correct when a record is created/updated), determinations (e.g., modify instances of BO based on trigger conditions) and actions (e.g., non-standard operations used to provide customized, business-logic-specific behavior (e.g., approving a purchase order or canceling a flight are activities implemented as an action)).

The BO runtime 227 may include an interaction phase in which a consumer calls the BO operations to change data and read instances with or without the transactional changes. The BO runtime keeps the changes in its internal transactional buffer which represents the state of the instance data. After all changes are performed, the data may be persisted per a save sequence. In EML, the save sequence is via a COMMIT syntax.

As described above EML enables access to the RAP BOs via a particular syntax and the RAP BOs may be accessed during execution of a test of an E2E scenario written in EML. As described above, process 300 of FIG. 3 describes execution of a test of an E2E scenario written in EML during an interaction phase of the BO runtime.

Figure 9:
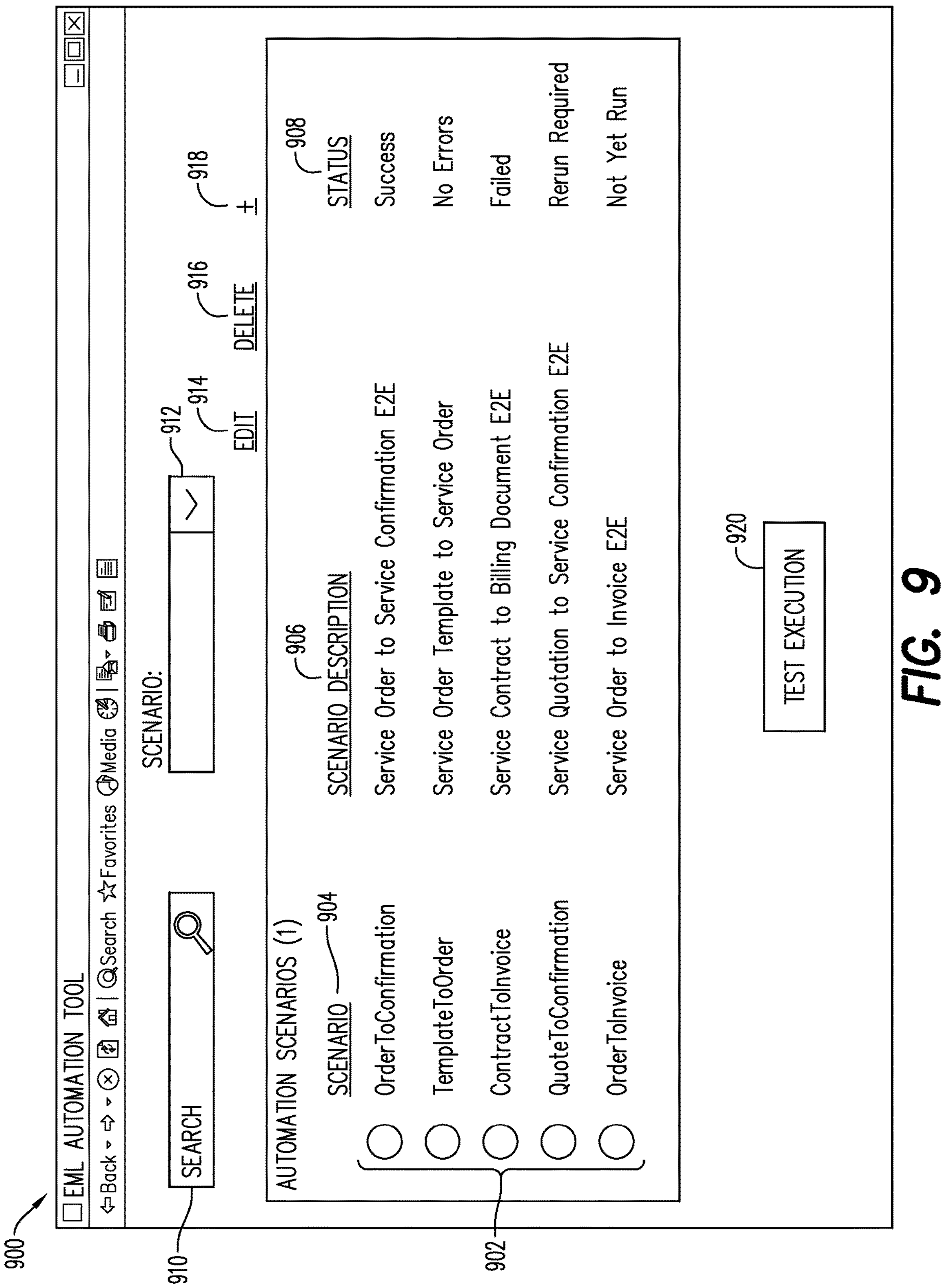
FIG. 9 is a diagram illustrating a user interface according to some embodiments.

Initially, at S310, a scenario ("scenario") is selected. As noted above, while the scenarios described herein may be E2E scenarios, embodiments may apply to scenarios that are not E2E scenarios, but rather a scenario with one or more tasks. As a non-exhaustive example, a Service Order Template to Service Order may be a scenario that is not an E2E scenario, as the Service Order Template to Service Order scenario may not test whether different software pieces work together (e.g., a single software piece performs all of the tasks). The scenario may be selected from a list 902 of one or more scenarios 904 provided on a scenario user interface (UI) 900 (FIG. 9) by the EML automation tool 204. While selection here is via a radio button, other suitable selection methods may be used. The list 902 may include for each scenario 904, a scenario description 906 and a scenario status 908. The scenarios 904 in the list 902 may be pre-defined scenarios that may or may not have been tested by the EML automation tool 204. The previously tested scenarios may have a status 908 of one of Success, No Errors, Failed, Rerun Required, or other suitable status. The scenario that has not been tested may have a status 908 of Not Yet Run. Instead of selecting a scenario 904 from the list 902, the user may search for a scenario via a search box 910, or may select a scenario not shown in the list 902 from a drop-down menu control 912. The scenario UI 900 may also include an edit control 914, a delete control 916 and an add control 918. The user may edit a selected scenario 904 via selection of the edit control 914; delete a scenario 904 via selection of the delete control 916; and add a new scenario via selection of the add control 918. The scenario UI 900 may also include a "Test Execution" control 920. Selection of the Test Execution control 920 initiates execution of the test.

After selection of a scenario 904 in S310, the EML automation tool 204 executes a test script ("test executable code") for the selected scenario in S312 in response to selection of test execution control 920. The data used in execution of the test may be selected by the EML automation tool from the database 212. In one or more embodiments the data and/or the test script may be modified by the user and the test script may be re-executed. Test script execution may be described further below with respect to FIG. 12.

Then in S314 a test output 1002 (FIG. 10) is generated in response to execution of the test script. The test output 1002 may be received by the user. The test output 1002 may be Success, Failure, Rerun, etc.

Figure 10:
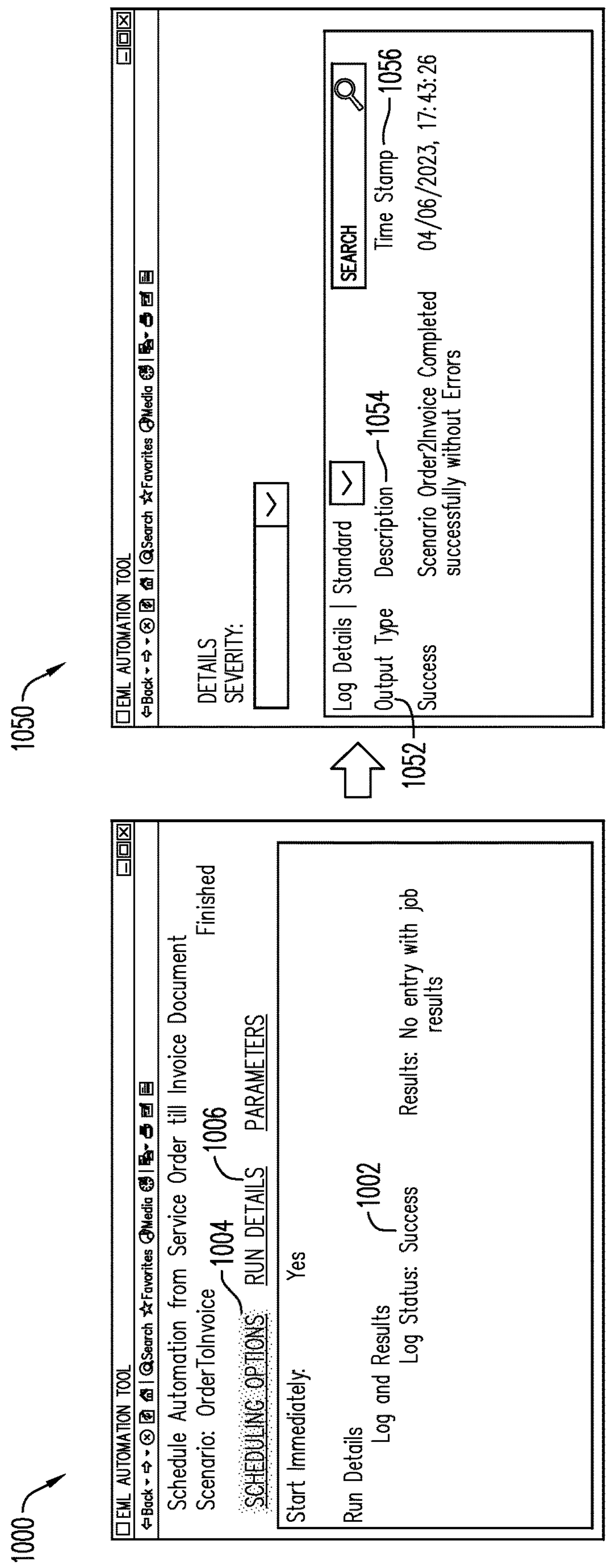
FIG. 10 is a diagram illustrating a user interface according to some embodiments.

FIG. 10 provides a test output UI display 1000. Here, a Scheduling Options Tab 1004 is selected. The test output 1002 may be indicated via a "Log Status". Here, the "Log Status" is "Success" indicating a successful test output. The test output 1002 may be logged and stored. Selection of a Run Details Tab 1006 may result in a display of a Detail UI 1050. The Detail UI 1050 may include an output type 1052 reiterating the test output, a description 1054 of the test, and a time stamp 1056 of the test.

Figure 11:
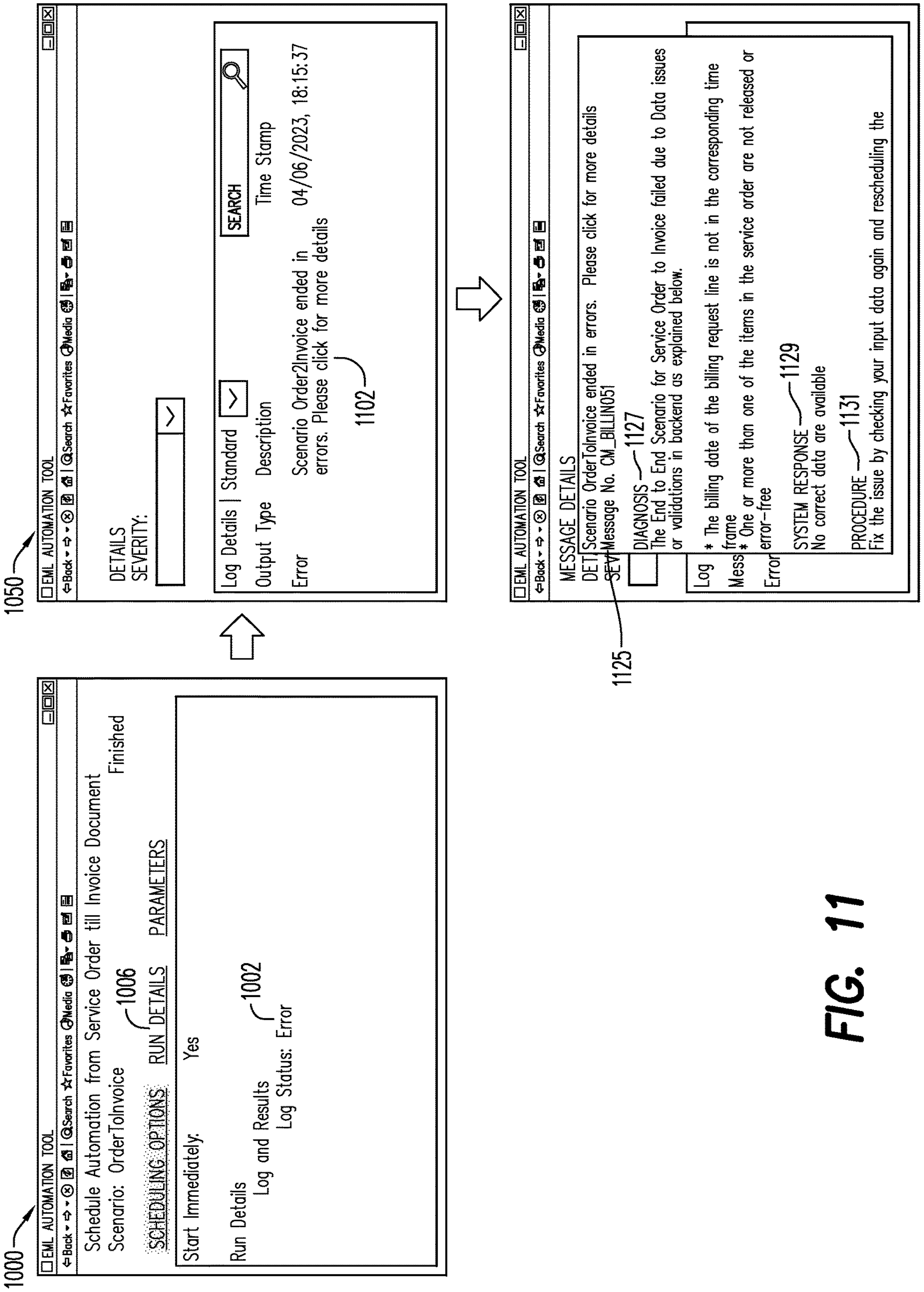
FIG. 11 is a diagram illustrating a user interface according to some embodiments.

FIG. 11 provides the test output UI display 1000, as shown in FIG. 10, but for a failed test output. Here, the "Log Status" is "Error". As above with FIG. 10, selection of a Run Details Tab 1006 may result in a display of a Detail UI 1050. In a case the Log Status is "Error," the description 1054 may include a link 1102 for more information about the error. Selection of the link 1102 may result in the display of an additional details pop-up window 1125. The additional details pop-up window 1125 may include a diagnosis for the error 1127, a system response 1129 to address the error and a resolution procedure 1131 for resolving the error. The diagnosis for the error 1127, system response 1129 and resolution procedure 1131 may be populated based on an application of a machine learning model.

Figure 12:
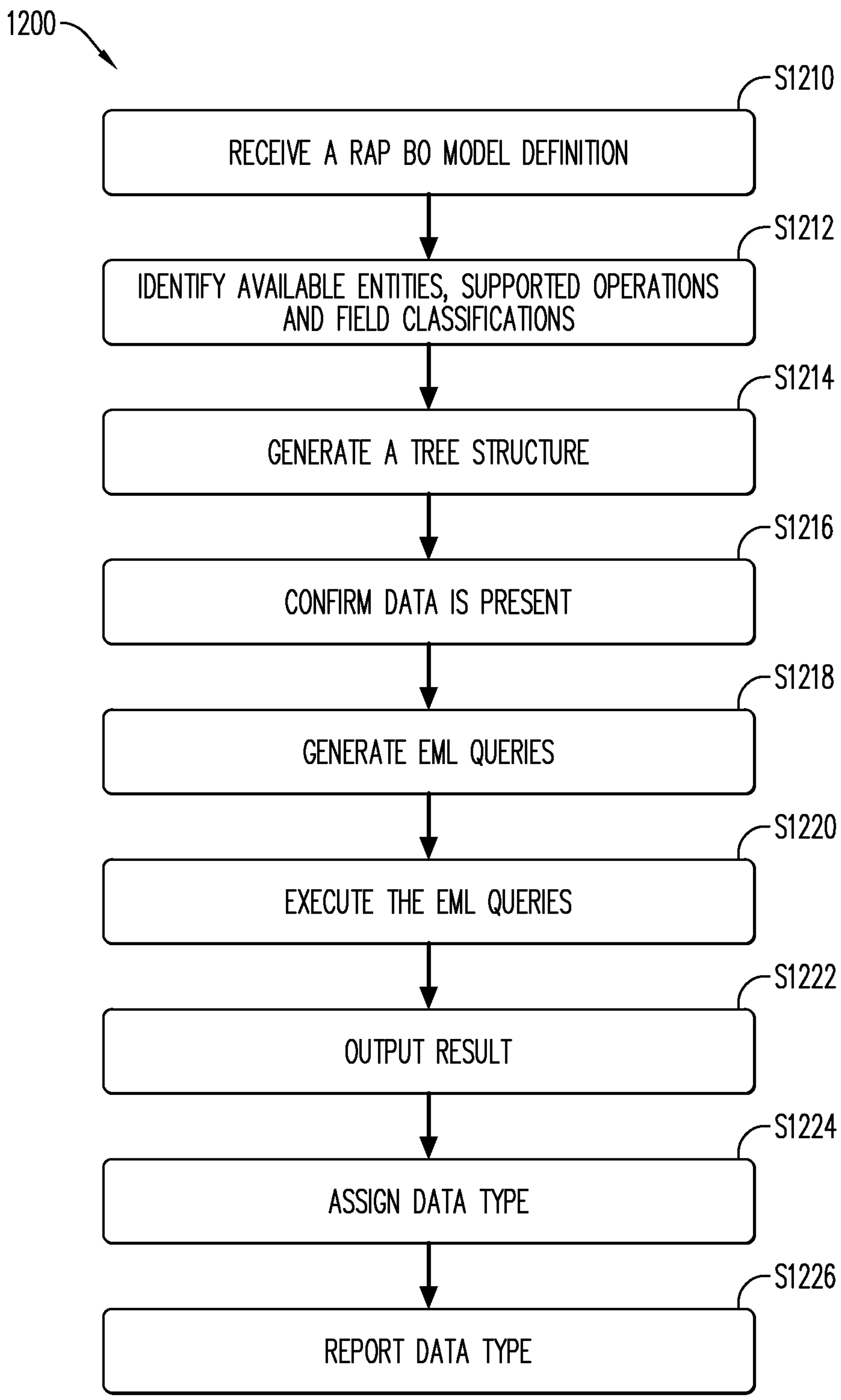
FIG. 12 is a flow diagram of a process according to some embodiments.

FIG. 12 illustrates a process 1200 for EML test script execution ("test execution") of S312 of FIG. 3 in accordance with an example embodiment. During test execution, test scripts for the scenarios may be autogenerated and executed for business objects determined to be part of the scenario. Test execution may include execution of a Pre-Learning Phase, a Data Extraction Phase, an Execution Phase and a Reporting Phase.

Pre-Learning Phase

Initially, at S1210 a RAP BO model definition 800 is retrieved. During the pre-learning phase the EML automation tool 204 traverses the retrieved RAP BO model definition 800 for each BO included in the selected scenario and in S1212 identifies, for that selected scenario, the available entities (e.g., child entities for the root entity), the supported operations, and field classification (e.g., as mandatory or read only, etc.). In a case the scenario is selected via the scenario UI 900, a mapping between the business object and root entity 802 of the definition 800 is determined via the pre-configured BO to RAP mapping table 224, such that the root entity 802 is identified in response to the scenario selection input from the UI. Pursuant to embodiments, the traversal may include a process that analyzes each business object in the scenario, including an analysis of the different operations. As a non-exhaustive examples, if the operation is "Read Entity," the Validate_Read_Entity (operation, entity, association) is called; if the operation is "Read Entity By Association, the Validate_Read_Entity_by_Assoc(operation, entity association) is called, etc. In the case of the Read operation, for example, the entity and its corresponding association are read.

As described above, FIGS. 8A and 8B provide a non-exhaustive example of an RAP BO model definition 800 that may define the root entity 802. The root entity 802 may serve as a representation of the business object. Continuing with the non-exhaustive example shown herein, I_ServiceOrderTP is the root entity 802. As noted above, the root entity 802 serves as a representation of the business object and defines the top node within the hierarchy on the BO structure. Additionally, the relationship between the entities 806 (FIG. 8B) in the BO hierarchy may be expressed in the definition by the keyword ASSOCIATION 804. Continuing with the non-exhaustive example shown herein, each of entities 806 ServiceOrderItemTP, SrvcOrdReferenceObejctTP, SrvcOrdUserStatusTP, etc. is associated with the I_ServiceOrderTP root entity 802. It is noted that different entities may have their own further defined and dependent entities lower in the hierarchy.

The definition 800 also includes an operation enablement status 808 (FIG. 8B) for each entity 806. The operation enablement status 808 may indicate the operations the entity is enabled for (e.g., whether the entity 806 is Create Enabled/Updated Enabled, both, etc.). Here, I_ServiceOrderTP has both Create and Update defined, meaning I_ServiceOrderTP entity is create and update enabled. Similarly, I_ServiceOrderItemTP is update and delete enabled.

The entities 806 may also include one or more fields 809 (FIG. 8C). The definition 800 may include a field status indicator 810 (FIG. 8C) indicating which fields/entities are Read-Only, Mandatory, Restricted, etc. A value is required in a mandatory field during the test, otherwise the test may fail. Here, ServiceOrder is read only, while ServiceOrderType is mandatory. Service Order Type is a mandatory field for creating a service order and without a value in this field, the service order will fail. Similarly, the SoldToParty field has a field status indicator 810 of mandatory. These two fields-ServiceOrderType and SoldToParty-need values in order to create a service order, and by extension also needs values in a test of creating a service order.

Continuing with the pre-learning phase, after the entities and corresponding relation with other entities are identified for the root entity, the tree structure 600 may be generated in S1214 for the entities and their relationship with the root entity.

Data Extraction Phase

Then, during the Data Extraction Phase, the EML automation tool 204 may confirm data is present for each entity included in the RAP BO 228 in S1216. For the confirmation of present data, the EML automation tool 204 may read each entity via execution of an EML Read query for each entity. Reading the entity results in an output of a count of the number of entries for that entity. In a case the count is zero, no data is present. In a case the count is greater than zero, data is present. In a case data is returned in response to the query (e.g., data is present for the entity), the EML automation tool 204 may continue to the Execution Phase. In a case no data is returned (e.g., no data is present for the entity), the EML automation tool 204 may try to create data using the mandatory fields in the definition 800. After creating data, the EML automation tool 204 may again confirm the presence of data per S1216. An error may be reported with a request to the user to create data in a case the EML automation tool 204 cannot create the data. The determination the EML automation tool 204 cannot create the data may be based on a pre-set number of tries to create data and/or an amount of time spent trying to create the data. The user may create the data through a user interface/API, etc.

Execution Phase

During the Execution Phase, the RAP BO 228 is tested with Create Read Update Delete (CRUD) operations. In one or more embodiments, the operations that are tested may include, but are not limited to, Read Entity, Read Entity by Association, Create Entity, Create Entity by Association, Delete Entity, Update Entity, Execute Action, Execution Function, Validate Locks Authorization Verification through privileged mode and unprivileged mode, Execute user-defined EML scrips. It is noted that in a privileged mode, authorization checks may be ignored when the EML statements are executed; while in an unprivileged mode authorization checks may be adhered to (e.g., may not be ignored). The RAP BO definition 800 may specify authorization objects as being privileged per a "define authorization context" block in the definition that marks the objects as requiring "no check when privileged". Pursuant to some embodiments, the default mode may include performance of authorization validations.

To test the model with the operations, EML test script queries ("EML queries") 1300 (FIG. 13) are generated dynamically using EML syntax in S1218. From the previous phases, the EML automation tool 204 has identified the entities and the operations that these entities support. The EML automation tool creates the EML queries based on the identified entities and supported operations using the EML syntax for the particular operations. As a non-exhaustive example, FIG. 13 includes EML syntax 1300 for non-exhaustive examples of EML READ operation 1302 and an EML CREATE operation 1304. It is noted that COMMIT Entities 1306 relates to committing/saving the information to a database. FIG. 14A includes another non-exhaustive example of an EML query 1400. Pursuant to some embodiments, the EML query is generated by first taking the root entity as an input, then reading all of the child entities for the root entity (which may be done through the entities) and performing the operations for each entity.

As a non-exhaustive example, each entity for the BO "I_ServiceOrderTP" is looped through by first constructing an op_tab internal table, which is an internal table holding the entity and sub-entity information. Then the EML query statement is created. For a Validate_Read_Entity operation, the EML statement may be: (e.g., READ ENTITIES OERATIONS op_read_tabl FAILED data (IT_failed) REPORTED (Data(It_reported). During creation of the EML query statement, the PRIVILEGED keyword (e.g., READ ENTITIES PRIVILEGED OPERATIONS) may be added. Next, all the fields of the entity are retrieved, and the results field of op_read_tabl internal tables are stored. The generated Read EML query statement is then executed.

FIG. 14B includes a dynamic EML query 1450, which is another way of representing the EML as compared to the EML query 1400 of FIG. 14A.

As another non-exhaustive example, consider a Validate_Create_entity operation for the entity I_ServiceOrderTP. Each entity in the business object I_ServiceOrderTP is looped through via the following steps. First, the CDS view for the entity specified is read. In a case the entity is the root entity, all the fields are filled (except the key fields) to construct the op_create_tab-instances (internal table). In a case the entity is not the root entity, all the fields are filled along with the key fields of the root entity to construct the op_create_tab-instances. The op_create_tab (internal table) is constructed. Then the EML query statement is generated. The EML query statement may be MODIFY ENTITIES OPERATIONS op_create_tab FAILED DATA(IT_failed) REPORTED DATA(IT_reported), where op_create_tab is an internal table which holds the entity and association information, It_failed indicates the EML statement failed reason is stored, and It_reported indicates the EML statement that is reported will contain the error message for the failure. Next the generated Create EML query statement is executed.

It is noted that EML may be used to query a parent entity or grandparent entity from a child entity. As a non-exhaustive example, A (header) has a hierarchy of grandparent, B (item) has a hierarchy of parent, and C (Item Partner) has a hierarchy of child, the EML query may get the values of A entity from C entity using the READ operation, for example. As another non-exhaustive example, the association supported by R_ServiceOrderTP behavior definition 1500 is shown in FIG. 15. R_ServiceOrderTP is the root entity per the "authorization dependent by" code 1502, with the R_SrvcOrdItmPartnerTP entity per the "define behavior for" code 1504, the associations 1506 are included in the box 1508. Here, from the SrvcOrdItemPartner entity, the read query may be performed on any of: 1. ItemPartnerAddress (this is a child entity of SrvcOrdItemPartner), 2. Item (this is a parent of SrvcOrdItemPartner entity), and 3. ServiceOrder (this is a grandparent entity of SrvcOrdItemPartner). It is noted that the prefix "R_" may indicate a restricted service and so the user cannot directly query on this view. Similarly, other operations (e.g., CRUD operations) may also be performed based on the association specified in the definition. It is further noted that the by-association operations work reciprocally, i.e., a child instance may be read via the parent, and a parent instance may be read via the child. Using this feature of EML, the EML automation tool 204 provides for testing—via the queries—from any node/entity, resulting in a more robust testing ability. The EML automation tool 204 may, at runtime, generate all of the possible EML queries based on the tree structure 600 using the reciprocal arrangement, and then execute them. The depth of the tree may be of any level and may not be restricted to the three levels of the A, B, C example above. Based on the RAP BO 228, the associations defined in the model determine the levels and automated test cases to be generated.

Then in S1220 the generated EML queries are executed and a result 230 is output in S1222. Execution of the EML query may use the data confirmed to exist in the previous phases.

Reporting Phase

In the Reporting Phase the accuracy of the output result 230 is determined. In S1224 a data type indicative of the accuracy may be assigned to the output result 230. The data type may be one of "Correct data present for the entity", and "Incorrect data present for the entity".

The data type assignment may be determined via a machine learning model 232 and may be based on a comparison of the output result 230 to an expected result 234. To generate the expected result, the EML automation tool 204 generates a direct query on the database 212 itself using Structured Query Language (SQL) ("direct query"), for example, for the operation performed via the respective EML query. The EML automation tool 204 then executes the direct query. As a non-exhaustive example, a READ operation may be performed for the I_ServiceOrderTP using the direct query (e.g., select * from I_ServiceOrderTP) to generate the expected result 234; while the READ operation may be performed for the I_ServiceOrderTP using the EML query (e.g., READ entities of I_SERVICEORDERTP Entity ServiceOrder ALL FIELDS WITH input_keys RESULT result_tab.) to generate the output result 230. The EML automation tool 204 via the machine learning (ML) model 232 then compares the expected result 234 to the output result 230. In a case the expected result 234 matches the output result 230, the data type assignment may be "Correct data present for the entity." It is noted that a data type assignment of "Correct data present for the entity" may indicate the operation was successfully executed. In a case the expected result does not match the output result, the data type assignment may be "Incorrect data present for the entity." The incorrect data may be the result of a difference of data format and/or invalid data. As a non-exhaustive example of data format differences, the direct query may return an expected result 234 in a date having a format of MMDDYY, while the EML query returns an output result 230 in a date having a format of DDMMYYYY. As a non-exhaustive example of invalid data differences, the direct query may return an expected result 234 of CB123, while the EML query returns an output result 230 of CB456. In a case the data type assignment is "Incorrect data present for the entity," the inaccuracy of the data may be captured and identified as a data format error or an invalid data error per the ML model 232. In response to the data type assignment, the assignment and further analysis may be sent as a report 236 to the user 216 in S1226. In response to the data type assignment of "Incorrect data present for the entity," an error notification may be sent to the user as part of the report 236. In some embodiments, the error notification may indicate the discrepancy. It is noted that the report 236 may also be sent to the user 216 in a case the data type assignment is "Correct data present for the entity."

Figure 16:
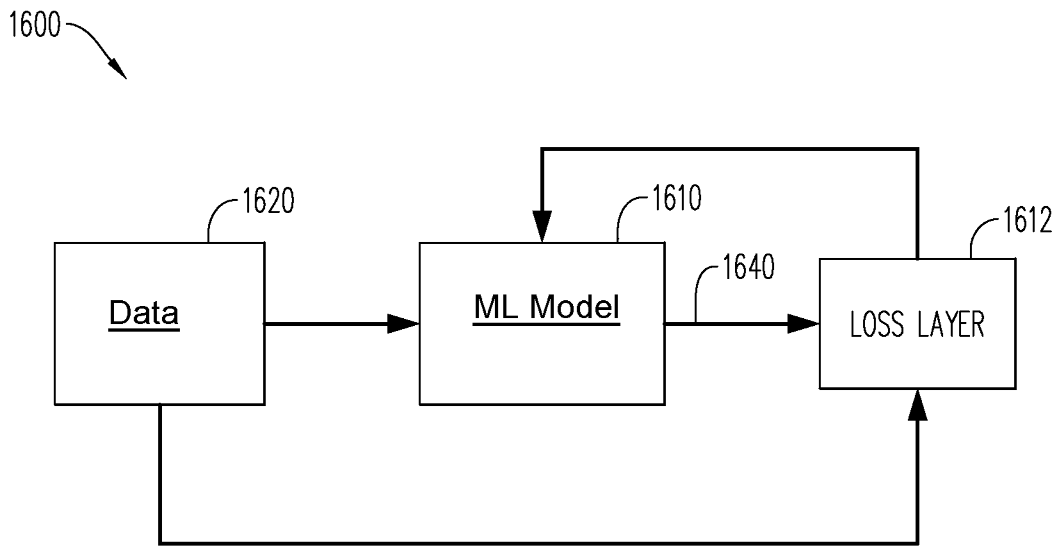
FIG. 16 illustrates training of a machine learning model according to some embodiments.

FIG. 16 illustrates a system 1600 for training the Machine Learning (ML) model 1610, to assign the output result according to some embodiments. The training is based on data input and output by monitoring nodes. Model 1610, and all other machine learning models described herein, may comprise a network of neurons (e.g., a neural network) which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data.

Embodiments may comprise any one or more types of models that are or become known, including but not limited to convolutional neural network models, recurrent neural network models, long short-term memory network models, deep reservoir computing and deep echo state network models, deep belief network models, and deep stacking network models. Use of a multilayer model allows for complex non-linear relationships between input parameters and output probabilities.

As is known in the art, the structure of model 1610 is defined by hyperparameters and initial node weights. The hyperparameters and initial node weights are designed to receive a numerical representation of values for various parameters, and output a probability that the node is performing unexpectedly (anomaly). As shown in FIG. 16, model 1610 is trained based on data 1620. Data 1620 may consist of detected input parameter values for metrics, and performance KPIs and detected anomalies. The detected anomalies may be considered "ground truth" data corresponding to a respective one of the input values/performance KPIs.

Training of model 1610 may consist of inputting data 1620 to model 1610, and operating model 1610 to generate, for each input, prediction of a result assignment 1640. Loss layer 1612 determines a total loss based on a difference between the predictions of result assignments 1640 and actual result assignment in the data 1620. The total loss is back-propagated to model 1610 in order to modify parameters of model 1610 (e.g., using known stochastic gradient descent algorithms) in an attempt to minimize the total loss.

Model 1610 is iteratively modified in the above manner, using a new batch of data 1620 at each iteration, until the total loss reaches acceptable levels or training otherwise terminates (e.g., due to time constraints or to the loss asymptotically approaching a lower bound). At this point, model 1610 is considered trained. Some embodiments may evaluate a performance of model 1610 based on testing data (e.g., data 1620 which was not used to train model 1610) and re-train model 1610 differently (e.g., using different initialization, etc.) if the performance is not satisfactory.

Figure 17:
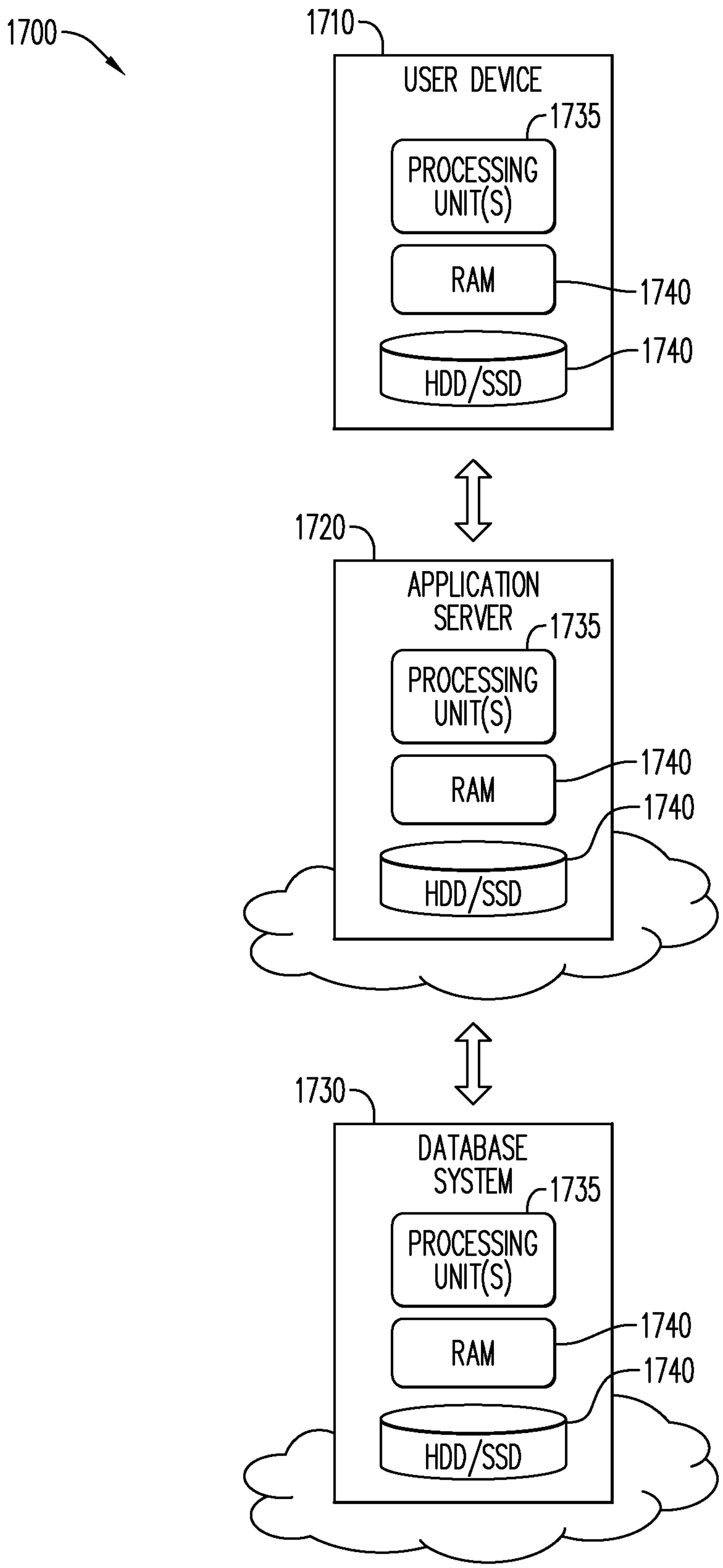
FIG. 17 is a block diagram of a cloud-based database deployment architecture according to some embodiments.

FIG. 17 illustrates a cloud-based database deployment 1700 according to some embodiments. The illustrated components may reside in one or more public clouds providing self-service and immediate provisioning, autoscaling, security, compliance and identity management features.

User device 1710 may interact with applications executing on one of the cloud application server 1720, for example via a Web Browser executing on user device 1710, in order to create, read, update and delete data managed by database system 1730. Database system 1730 may store data as described herein and may execute processes as described herein to cause the execution of the EML automation tool 204 for use with the user device 1710. Cloud application server 1720 and database system 1730 may comprise cloud-based compute resources, such as virtual machines, allocated by a public cloud provider. As such, cloud application server 1720 and database system 1730 may be subjected to demand-based resource elasticity. Each of the user device 1710, cloud application server 1720, and database system 1730 may include a processing unit 1735 that may include one or more processing devices each including one or more processing cores. In some examples, the processing unit 1735 is a multicore processor or a plurality of multicore processors. Also, the processing unit 1735 may be fixed or it may be reconfigurable. The processing unit 1735 may control the components of any of the user device 1710, cloud application server 1720, and database system 1730. The storage device 1740 may not be limited to a particular storage device and may include any known memory device such as RAM, ROM, hard disk, and the like, and may or may not be included within a database system, a cloud environment, a web server or the like. The storage device 1740 may store software modules or other instructions/executable code which can be executed by the processing unit 1735 to perform the process shown in FIGS. 3 and 12. According to various embodiments, the storage device 1740 may include a data store having a plurality of tables, records, partitions and sub-partitions. The storage device 1740 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
- one or more models, each model defining a respective data entity;
- a memory storing processor-executable program code; and
- a processing unit to execute the processor-executable program code to cause the system to:
  - receive a request to execute a test executable code for a first model of the one or more models;
  - identify a model framework for the first model, the identified model framework including a root entity representing the data entity, wherein the root entity defines a top node in a business object hierarchy;
  - identify one or more available entities for the root entity;
  - identify one or more supported operations for each identified available entity;
  - generate the test executable code for the first model based on the identified model framework, wherein the test executable code generation further comprises:
    - dynamically generating at least one Entity Manipulation Language (EML) test executable code query based on the identified available entities and using EML syntax for the one or more supported operations for each available entity;
  - generate an output via execution of the test executable code; and
  - report an analysis of the generated output.

2. The system of claim 1, wherein the model framework includes a model structure and a model definition.

3. The system of claim 2, wherein the model definition includes operations supported by the model framework, and a plurality of fields included in the respective data entity.

4. The system of claim 3, wherein each field of the plurality of fields is marked as one of mandatory and read only.

5. The system of claim 3, wherein the operations supported by the model are at least one of a create operation, a read operation, an update operation, a delete operation, an execute operation, a validate locks operation, and an authorization verification operation.

6. The system of claim 1, wherein each model is a RESTful Application Programming (RAP) model defining the respective data entity.

7. The system of claim 1, wherein the generation of the test executable code further comprises:
- executing each EML test executable code query.

8. The system of claim 7, wherein the at least one EML test query is generated for each operation supported by the model.

9. The system of claim 1, wherein reporting the analysis further comprises:
- generating an expected output; and
- assigning the generated output to a category based on a comparison of the generated output to the expected output.

10. The system of claim 9, wherein the expected output is generated via execution of a Structured Query Language (SQL) query directly on a database table.

11. The system of claim 9, wherein the category is one of: "Correct data present for the entity" and "Incorrect data present for the entity".

12. The system of claim 9, wherein the assignment is via execution of a machine learning algorithm.

13. A computer-implemented method comprising:
- receiving a request to execute a test executable code for a first model of one or more models, each model defining a respective data entity;
- identifying a model framework for the first model, the identified model framework including a root entity representing the data entity, a model structure defining fields for the data entity, a model definition defining operations performable by the data entity and a corresponding runtime implementation;
- identifying one or more available entities for the root entity, wherein the root entity defines a top node in a business object hierarchy;
- identifying one or more supported operations for each identified available entity;
- dynamically generating the test executable code for the first model as an Entity Manipulation Language (EML) test executable code query, the generated test executable code based on the identified available one or more entities and using EML syntax for the one or more supported operations for each available entity;

generating an output via execution of the test executable code; and reporting an analysis of the generated output.

14. The method of claim 13, wherein the operations supported by the model are at least one of a create operation, a read operation, an update operation, a delete operation, an execute operation, a validate locks operation, and an authorization verification operation.

15. The method of claim 13, wherein reporting the analysis further comprises:

executing a Structured Query Language (SQL) query directly on a database table to generate an expected output; and assigning the generated output to a category based on a comparison of the generated output to the expected output.

16. A non-transitory computer readable medium having executable instructions stored therein to perform a method, the method comprising:

receiving a request to execute a test executable code for a first model of one or more models, each model defining a respective data entity;

identifying a model framework for the first model, the model framework including a root entity representing the data entity, wherein the root entity defines a top node in a business object hierarchy;

identifying one or more available entities for the root entity;

identifying one or more supported operations for each available entity;

generating the test executable code for the first model as an Entity Manipulation Language (EML) test executable code query, the generated test executable code based on the identified one or more available entities and using EML syntax for the one or more supported operations for each available entity;

generating an output via execution of the test executable code; and reporting an analysis of the generated output.

17. The medium of claim 16, wherein the model framework includes a model structure and a model definition.

18. The medium of claim 16, wherein reporting the analysis further comprises:

executing a Structured Query Language (SQL) query directly on a database table to generate an expected output; and assigning the generated output to a category based on a comparison of the generated output to the expected output.

19. The medium of claim 18 wherein the category is one of: “Correct data present for the entity” and “Incorrect data present for the entity”.

20. The medium of claim 18, wherein the assignment is via execution of a machine learning algorithm.

* * * * *